(No Model.)
P. PFEIL.
DETACHABLE STRAINER FOR MILK PAILS.
No. 595,407. Patented Dec. 14, 1897.
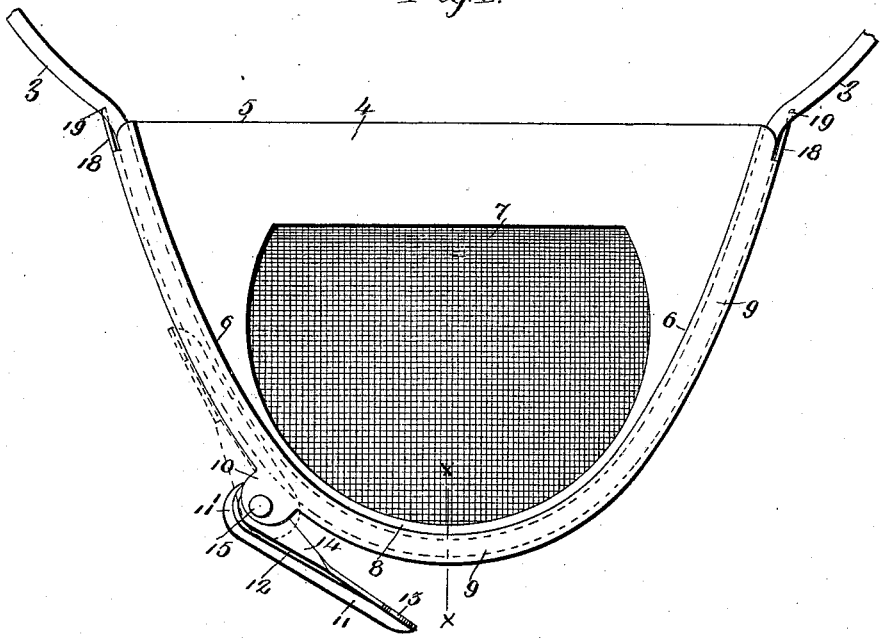
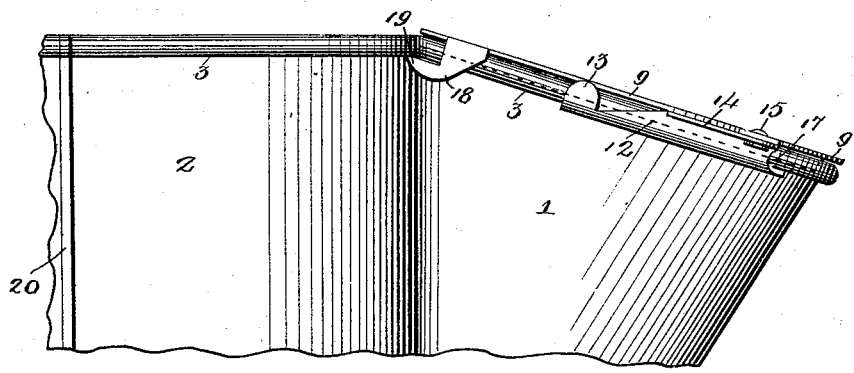
Witnesses
Inventor
Philip Pfeil.
By his Attorneys

UNITED STATES PATENT OFFICE.

PHILIP PFEIL, OF CHICAGO, ILLINOIS, ASSIGNOR OF ONE-HALF TO HERMANN RENDTORFF, OF SAME PLACE.

DETACHABLE STRAINER FOR MILK-PAILS.

SPECIFICATION forming part of Letters Patent No. 595,407, dated December 14, 1897.

Application filed March 9, 1897. Serial No. 626,638. (No model.)

*To all whom it may concern:*

Be it known that I, PHILIP PFEIL, a citizen of the United States, residing at Chicago, in the county of Cook and State of Illinois, have invented certain new and useful Improvements in Milk-Pails and Detachable Strainers Therefor, of which the following is a full, clear, and exact description, reference being had to the accompanying drawings, forming a part hereof.

My invention has relation to improvements in milk-pails and strainers therefor; and it consists in the novel arrangement and combination of parts more fully set forth in the specification and pointed out in the claims.

In the drawings, Figure 1 is a top plan view of the spout portion of my improved pail with the strainer attached, the locking-arm thereof being swung open. Fig. 2 is a side elevation of the same with the locking-arm closed, showing a portion of the pail proper. Fig. 3 is a perspective view of the locking-arm inverted, and Fig. 4 is a detail section on the line *x x* of Fig. 1.

The object of my invention is to construct a milk-pail and strainer therefor, the latter being specially adapted to be readily attached to or detached from the former, the strainer when once secured to the spout forming a tight joint with the inner surface of the latter by reason of the specific construction of the coöperating parts of said strainer and spout. In the present invention the bead of the pail being disposed about the upper edge thereof and wholly along the outside of the pail leaves the inner surface of the pail and spout smooth and uninterrupted. Against this curved surface the outer curved wall of the strainer is adapted to bear throughout its full extent, thereby insuring a tight joint between the parts and preventing any accumulation of cream and dirt along the edge of the pail. Furthermore, the connection between the spout and body portion of the pail is in the present case seamless, the spout forming an integral part of the wall of the pail, this arrangement enabling me to form a continuous bead at the points of juncture of the edges of the spout and the edge of the pail proper, thus dispensing with an accumulation of solder at these points and permitting the ready attachment to the spout of the toes with which the strainer is provided. In detail the invention may be described as follows:

Referring to the drawings, 1 represents the spout of my milk-pail 2, the spout being outwardly convex, as usual, and the pail, as well as the spout, being provided along the upper edge with a wire band or bead 3, located about the outer surface of the pail, the free edge of the metal of the pail being folded over the wire, as shown, and forming a suitable bead for the outside of the pail and spout. By this construction the inner surface of the pail and spout is left perfectly smooth, allowing the contents of the pail to flow uninterruptedly until it reaches the strainer. The strainer, which is made of a single piece of metal, is composed of a suitable plate 4, having a rear transverse edge 5 and a curved edge bounded by an upturned wall 6, conforming in outline to the general curvature of the upper convex edge of the spout. An opening is cut in the plate 4, over which the strainer-gauze 7 is superposed, a sufficient strip of metal 8 being left adjacent to the wall 6 to secure the gauze to. Formed integrally with the wall 6 is an outwardly-extending ledge or flange 9, adapted when the strainer is in position to rest on the upper edge of the spout and form a tight joint between it and the spout.

Adapted to swing substantially parallel to the upper edge of the spout and pivoted to a projecting lug 10, disposed along the ledge 9 at any convenient point to one side of the narrowest portion of the spout, is a locking-arm stamped or formed from a single piece of metal, said arm comprising a horizontal ledge 11, having a curved basal portion 11' extending around the pivotal point of the arm. Deflected from the horizontal ledge 11 is the vertical wall 12, suitably cut away at its forward or free end to form a terminal lug 13, by which the arm can be grasped. The vertical wall has formed integral therewith the horizontally-deflected triangular wing 14, about the base of which the locking-arm is pivoted, the pivotal pin 15 passing through the opening 16 thereof. When the strainer-plate is in position over the spout, the ledge 9 thereof rests upon the upper edge of the spout, the wall bearing against the inner surface of the spout, as best shown in Fig. 4. When the locking-arm is open, it occupies the position shown in full lines in Fig. 1, and as the said arm is swung to the position indicated by dotted lines in said figure it is apparent that the upper surface of the ledge 11 will progressively engage the bead of the pail along the under side thereof, it being understood that the vertical wall 12 of the locking-arm is in depth substantially equal to the thickness or diameter of the bead. When the arm is fully locked, the vertical wall 12 thereof bears against the outer vertical surface of the bead, and the ledge 11 bears against the under surface thereof, the said ledge 11, moreover, by its resiliency and the general yielding tendency of the arm drawing the ledge 9 of the strainer firmly against the upper surface or edge of the bead. In order that the base of the locking-arm may swing freely and without binding against the bead, the rear end of the vertical wall 12 thereof where it joins the wing 14 is scooped out, as best seen at 17. The rear of the strainer is held by the lateral retaining-lugs 18, carried by or forming a part of the ledge 9, each lug having an upturned end or toe 19, adapted to pass under the bead 3 on the outside of the pail at the meeting-point of the spout with the pail proper. The toes 19 thus form a hinge for the strainer-plate, enabling the latter to be readily placed in position on the pail by simply passing the toes under the bead at the points referred to, when the locking of the forward part of the strainer by the locking-arm is readily accomplished.

With my improvement the wire band 3 of the upper edge of the pail can be disposed along the outer surface, leaving the inner surface of the pail perfectly uninterrupted and smooth, there being no depressions or grooves formed for the reception of the curved edge of the strainer, which are liable to hold sediment and within which are liable to lodge matters conducive to the generation of lactic fermentation, and the pail can always be kept perfectly clean, and the joint between the ledge 9 and the upper edge of the pail is perfectly tight. As will be best seen in Fig. 2, the only seam (20) in the pail-body is to one side of the spout, the connection between the spout and pail proper being seamless, whereby the bead 3 is continuous along the upper meeting edges of the spout and pail, thereby dispensing with solder and permitting the ready and free insertion of the toes 19 under the bead and under the angle formed in the bead at the juncture of the upper edge of the spout and pail. It is obvious, of course, that I need not limit myself either to the number of locking-arms or to their exact position along the curved edge of the strainer.

Having described my invention, what I claim is—

1. In a milk-strainer, a suitable plate having a rear transverse edge, a forward edge having a curvature approximating the curvature of the pail-spout, and a locking-arm pivoted to and carried by the curved edge, said arm adapted to sweep or swing in a line substantially parallel to the upper edge of the spout and to engage the bead of the pail by which the strainer-plate is carried, substantially as set forth.

2. In a milk-strainer, a suitable plate having a rear transverse edge, a forward edge having a curvature approximating the curvature of the pail-spout, an outwardly-projecting lug forming a part of or carried by the curved edge, and a locking-arm pivoted to the lug and adapted to sweep or swing in a line substantially parallel to the upper edge of the spout and engage the bead forming a part of said spout, substantially as set forth.

3. In a milk-strainer, a suitable plate having a rear transverse edge, a forward edge having a curvature approximating the curvature of the pail-spout, a continuous wall following the curved edge of the plate, a flange projecting from said wall adapted to rest on the wired edge of the spout, suitable lugs carried by the rear of the strainer each lug having a toe adapted to engage the bead of the pail from the outside at the juncture of the spout and pail proper, a lug carried by the strainer-flange, and a locking-arm pivoted to said lug and adapted to sweep in a line parallel to the upper edge of the spout and engage the base of the bead forming a part of said spout, substantially as set forth.

4. In a milk-strainer, a suitable plate having a rear transverse edge, a forward edge having a curvature approximating the curvature of the pail-spout, a locking-arm pivoted to the curved edge, said arm comprising a suitable ledge adapted to engage the under side of the bead of the spout, a vertical wall deflected from said ledge and being approximately of a depth equal to the thickness of the bead, and a wing deflected from the vertical wall and parallel to the engaging ledge of the arm, the pivot of the arm passing through the base of the wing, the parts operating substantially as and for the purpose set forth.

5. In a milk-strainer, a suitable strainer-plate, a locking-arm for the same, said arm comprising a suitable horizontal member forming a ledge adapted to engage the under side of the bead of the spout of the pail, a vertical wall deflected from the horizontal member, a terminal lug forming a portion of the vertical wall, a horizontally-deflected wing forming a part of the vertical wall, the wing being substantially triangular, the base of the triangle serving as the pivotal point for the arm, and a scooped-out portion formed at the meeting-point between the vertical wall and triangular wing to enable the arm to swing freely about the bead, the depth of the vertical wall being substantially that of the thickness of the bead whereby the horizontal member of the arm can snugly engage the under surface of the bead of the spout, substantially as set forth.

6. In a milk-pail, a strainer made in one piece, and one or more locking-arms pivoted along the outer curved edge of the same, said arms being adapted to sweep or swing in a plane substantially parallel to the edge of the strainer and to engage the under surface of said bead, substantially as set forth.

In testimony whereof I affix my signature in presence of two witnesses.

PHILIP PFEIL.

Witnesses:
S. S. EDWARDS,
ROBT. LEMCKE.